US011816211B2

(12) United States Patent
Fry et al.

(10) Patent No.: US 11,816,211 B2
(45) Date of Patent: Nov. 14, 2023

(54) ACTIVE SIGNALING IN RESPONSE TO ATTACKS ON A TRANSFORMED BINARY

(71) Applicant: RUNSAFE SECURITY, INC., McLean, VA (US)

(72) Inventors: Shane Fry, Madison, AL (US); Brent Bessemer, Huntsville, AL (US)

(73) Assignee: RUNSAFE SECURITY, INC., McLean, VA (US)

(*) Notice: Subject to any disclaimer, the term of this patent is extended or adjusted under 35 U.S.C. 154(b) by 120 days.

(21) Appl. No.: 17/389,195

(22) Filed: Jul. 29, 2021

(65) Prior Publication Data
US 2022/0035911 A1 Feb. 3, 2022

Related U.S. Application Data

(60) Provisional application No. 63/059,253, filed on Jul. 31, 2020.

(51) Int. Cl.
*H04L 29/06* (2006.01)
*G06F 21/55* (2013.01)
*G06F 21/54* (2013.01)
*G06F 21/56* (2013.01)

(52) U.S. Cl.
CPC ............ *G06F 21/554* (2013.01); *G06F 21/54* (2013.01); *G06F 21/552* (2013.01); *G06F 21/566* (2013.01)

(58) Field of Classification Search
CPC ...... G06F 21/554; G06F 21/54; G06F 21/552; G06F 21/566; G06F 21/51; G06F 21/52; G06F 2221/2141
See application file for complete search history.

(56) References Cited

U.S. PATENT DOCUMENTS

| 2005/0034024 A1* | 2/2005 | Alverson | G06F 11/362 |
| | | | 714/E11.21 |
| 2009/0063801 A1 | 3/2009 | Genty et al. | |
| 2009/0113424 A1 | 4/2009 | Chen et al. | |
| 2010/0293342 A1* | 11/2010 | Morfey | G06F 9/30167 |
| | | | 711/E12.001 |
| 2016/0085970 A1* | 3/2016 | Rebelo | G06F 21/51 |
| | | | 726/25 |
| 2019/0138725 A1 | 5/2019 | Gupta | |
| 2020/0201648 A1* | 6/2020 | Memon | G06F 9/54 |

OTHER PUBLICATIONS

International Search Report and Written Opinion for International Application No. PCT/2021/043775; dated Nov. 1, 2021; 14 pages.

* cited by examiner

Primary Examiner — Evans Desrosiers
(74) Attorney, Agent, or Firm — Perkins Coie LLP

(57) ABSTRACT

An apparatus and method for responding to an invalid state occurrence encountered during execution of a third-party application program is included. The apparatus performing the method which includes registering a trap signal handler with a kernel of an operating system. The method also including intercepting calls from the third-party application program to the operating system and processing an exception signal corresponding to the invalid state to generate a response. The response including performing a signal reporting process.

17 Claims, 11 Drawing Sheets

FIG. 1B

| Line | Address | Op Code | Instruction | |
|---|---|---|---|---|
| 1 | 0000359b | 80 3d5e7b000000 | cmp | byte [rel data_b100], 0x0 |
| 2 | 000035a2 | 4889c3 | mov | ebx, rax |
| 3 | 000035a5 | 741c | je | 0x35c3 |

131

↓ 134
Op Code Offset

| 1 | 0000359c | 3d5e7b000000 | cmp | eax, 0x7b5e |
|---|---|---|---|---|
| 2 | 000035a1 | 004889 | add | byte [rax-0x77], cl |
| 3 | 000035a4 | c3 | retn | {return addr} |

| 1 | 00400807 | 55 | push | rbp {__saved_rbp} |
|---|---|---|---|---|
| 2 | 00400808 | 4889e5 | mov | rbp, rsp {__saved_rbp} |
| 3 | 0040080b | bfff084000 | mov | edi, 0x4008ff {"/bin/ls"} ← B |
| 4 | 00400810 | e8cbfdffff | call | system ← A |
| 5 | 00400815 | 90 | nop | |
| 6 | 00400816 | 5d | pop | rbp {__saved_rbp} |
| 7 | 00400817 | c3 | retn | {__return_addr} |

FIG. 1D

| 1 | 00400876 | 4883c408 | add | rsp, 0x8 |
|---|---|---|---|---|
| 2 | 0040087a | 5b | pop | rbx {__saved_rbx} |
| 3 | 0040087b | 5d | pop | rbp {__saved_rbp} |
| 4 | 0040087c | 415c | pop | r12 {__saved_r12} |
| 5 | 0040087e | 415d | pop | r13 {__saved_r13} |
| 6 | 00400880 | 415e | pop | r14 {__saved_r14} |
| 7 | 00400882 | 415f | pop | r15 {__saved_r15} ← C |
| 8 | 00400884 | c3 | retn | {__return_addr} |

136

↓ 140
Op Code Offset

| 1 | 00400883 | 5f | pop | rdi {__return_addr} ← D |
|---|---|---|---|---|
| 2 | 00400884 | c3 | retn | {arg_8} |

| Address | Op Code (hex) | Op Code (ASCII) |
|---|---|---|
| 00601060 | 2f 62 69 6e 2f 63 61 74<br>20 66 6c 61 67 2e 74 78 74 | /bin/cat flag.txt. ← E |

FIG. 1F

| 1 | Random_bytes |
|---|---|
| 2 | 0x00400883 (Gadget D) |
| 3 | 0x00601060 (Gadget E) |
| 4 | 0x00400810 (Gadget A) |

ACTIVE SIGNALING IN RESPONSE TO ATTACKS ON A TRANSFORMED BINARY

CROSS-REFERENCE TO RELATED APPLICATION(S)

This application claims priority to and the benefit of U.S. Provisional Application No. 63/059,253, filed Jul. 31, 2020, titled "ACTIVE SIGNALING IN RESPONSE TO ATTACKS ON A TRANSFORMED BINARY," the disclosure of which is incorporated herein by reference in its entirety.

TECHNICAL FIELD

The present technology provides a method and system for generating a response to a memory corruption encountered during normal program execution. Memory corruptions can occur during a return-oriented programming (ROP) cyber attack on a transformed program binary.

BACKGROUND

ROP attacks can be mitigated by transforming program binaries such that the addresses of various pieces of code are randomized while program functionality remains the same. Examples of technologies which mitigate ROP attacks include Alkemist® by RunSafe Security, Inc. and Polymorphing for Linux by Polyverse, Inc. When an ROP attack occurs on a transformed binary, the attack usually directs the CPU to transfer control to a random point within a computational process, often resulting in an unstable, invalid, or inoperable state and eventually causing the process to crash. Thus, there is a need for technologies that are able to detect an attack and generate a system response in the event of an attack on a transformed binary or otherwise when a transformed binary enters an invalid program state.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure but are intended to be illustrative only.

FIG. 1B shows a method for manipulating existing machine code to create an ROP gadget.

FIG. 1C shows an example of utilizing existing machine code as an ROP gadget.

FIG. 1D shows an example of utilizing manipulated machine code to create an ROP gadget.

FIG. 1E shows an example of existing application data to be utilized as an element of a ROP attack chain.

FIG. 1F shows a sequence of ROP gadgets and elements utilized to form a ROP attack chain.

DETAILED DESCRIPTION

Figure 1A:
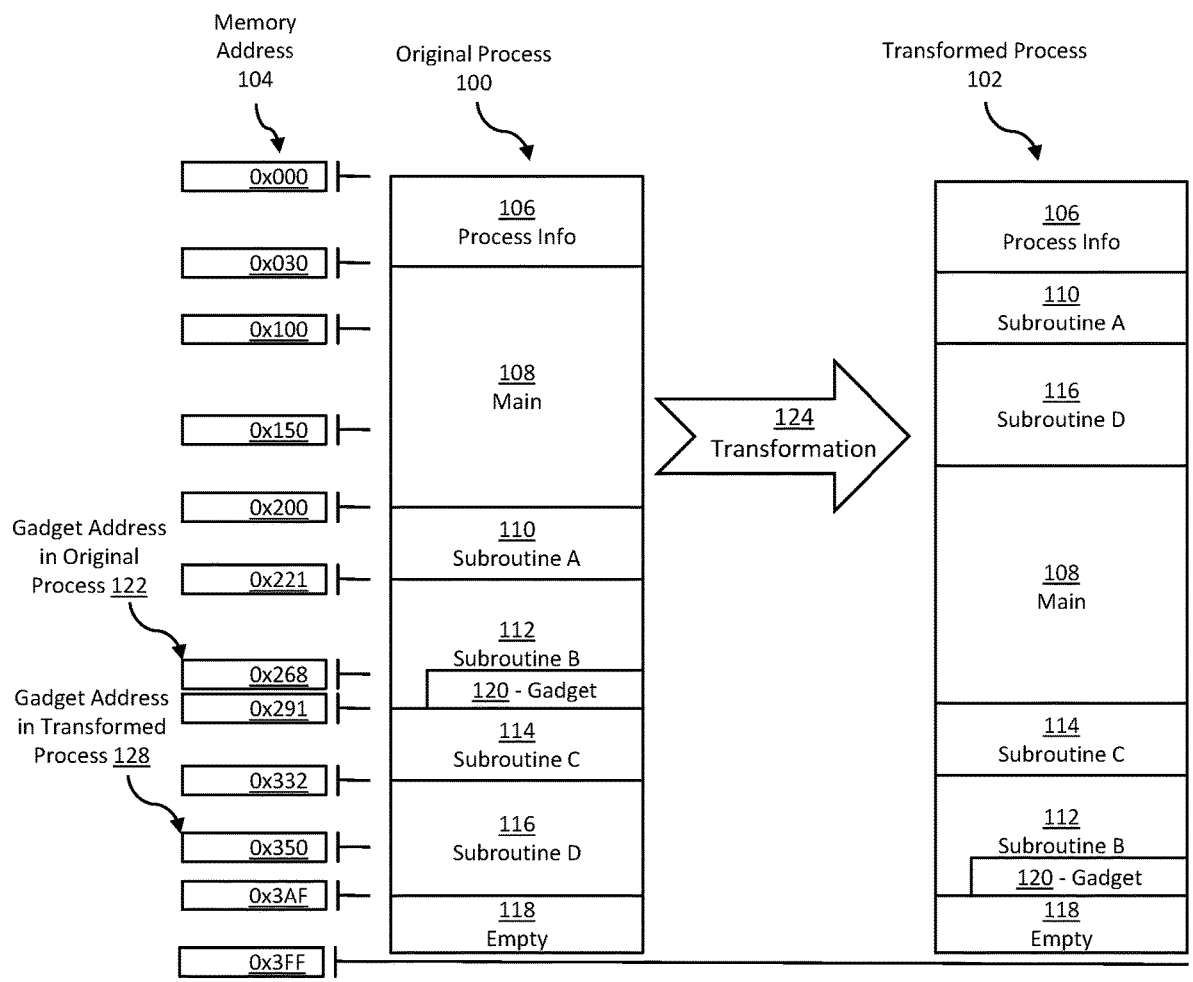
FIG. 1A shows the transformation of a program for preventing a ROP attack.

Return-oriented programming (ROP) attacks are a type of cyberattack based on overwriting the return address of the code from where execution of the program jumps to a subroutine or a function. The return address of the code is typically stored in a special region of memory known as the "stack," (which can store return addresses and other types of data such as data for the variables used in the subroutine or function). If the program contains a bug or an error, a malicious user can send specially crafted input to the vulnerable program which can cause unintended behavior. For example, an attacker can overwrite an intended return address of the code with a fake return address selected by the attacker to gain control of the program's execution. In many attacks, the attacker inserts a sequence of false return addresses onto the stack, each of which refers to a snippet of the vulnerable program's code known as a ROP gadget. When executed in the proper order, the sequence of ROP gadgets acts as a new "program" that performs an action intended by the attacker, such as allowing greater access to the system.

ROP attacks can be mitigated by transforming program binaries such that the addresses of various pieces of code are randomized while program functionality remains the same. When an attacker attempts to utilize a ROP gadget on a transformed binary, rather than executing the sequence of code (anticipated by the attacker) from where execution of the program had jumped to a subroutine or a function, the system will begin to execute code at a random location within the transformed program binary.

A ROP attack mitigated by binary transformation can be prevented from fulfilling whatever malicious purpose its creator had intended for it, such as leaking sensitive information or gaining remote access to a system. However, attempts to execute code at random locations within the binary can place the program in an invalid state, meaning that the program will shortly "crash" (i.e., be terminated by the operating system after attempting an invalid action).

When a program attempts to do something invalid (examples include, but are not limited to, accessing memory which it doesn't have permission to access, or executing an instruction which the central processing unit (CPU) doesn't recognize), this will trigger an "exception" in the CPU, which will cause an "exception handler" within the operating system to be executed.

On most systems, the default behavior of an exception handler is to abruptly terminate the process, providing little or no diagnostic information to the user.

Embodiments disclosed herein are directed at auditing the cause and occurrence of invalid states/crashes in computer programs. The disclosed technology, among other things, can provide real-time (or near real-time) notifications to another system (or a user) that the program has been terminated, thereby minimizing loss or disruptions in service. The disclosed technology can allow for a graceful exit by the program thereby minimizing loss of data. Further, the disclosed technology can provide information about the attack to another automated system (or a user) to take corrective action or update the security policy of the system. This can allow in preventing future cyberattacks on the program. By using a signaling mechanism (alternatively termed as a signal handler) at the operating system (OS) level, the disclosed technology can provide detailed information relating to the cause and occurrence of an invalid state. This can help in alerting system administrator when a cyberattack has occurred. Also, the disclosed signaling mechanism can be used to customize the behavior of the program after a program has crashed.

By collecting in-memory artifacts from the program following an exception, defenders have more tools at their disposal to understand attacker intentions and methods. Examples of the types of analysis that may be possible include the ability to differentiate between malicious attacks and non-malicious errors, the location of the original vulnerability that caused the program to be exploited, or the ability to identify a "signature" or other information about the attack. Additionally, the present disclosure allows developers to easily add error handlers to open source or third-party components.

Linux-based terminology is used throughout this document for the sake of example, but the concepts and functionalities disclosed herein are broadly applicable to all operating systems (including Linux, Microsoft Windows, Apple's macOS and iOS, and Google's Android), regardless of the specific terminology used in different operating systems. The present application makes use of examples which are used to encourage high-level understanding of the methods disclosed herein. Examples may reference an operation on a particular operating system, such as Linux system, which may not directly translate to a corresponding operation on another operating system, however, in most cases the task can be implemented by either using a similar command or series of commands to accomplish similar results. Additionally, the examples present a stand-alone PC architecture, however, it should be understood that the disclosed techniques extend across a variety of modern operating systems ranging from small systems such as tablets, smartwatches, cell phones, and OS based embedded systems to more complex systems such as client-server networked systems and cloud computing services.

The present disclosure uses terms which may have various definitions either by industry jargon or implied as a term of the art. In some cases, the existence of an element may change based on the medium on which it resides—such as a program which exists as a file on a disk may change to a process once it is loaded into memory for execution. To aid in presenting the ideas and concepts a series of terms are defined. The term program refers to a set of executable instructions, usually stored as a file on a storage medium. A process is the specific instance of a program being executed. As used herein, the term "third-party application", as it appears in drawings and the specification, refers to an executable process, typically residing in system memory, designed to accomplish a task, which may be subject to a binary transformation, and within the context of this disclosure, a potential target of a ROP cyber-attack.

FIG. 1A shows an example of a high-level and simplified overview of a binary transformation of a third-party application. FIG. 1A shows an original process arrangement 100 getting modified into a transformed process 102 as a result of transformation 124. The left portion of FIG. 1A shows example virtual memory addresses 104 where components of the original process 100 and transformed process 102 are stored in memory. The original process 100 includes in an ordered sequence: process information 106 stored at memory offset 0x000, main application 108 stored at memory offset 0x030, subroutine A (denoted using numeral 110) stored at memory offset 0x200, subroutine B (denoted using numeral 112) stored at memory offset 0x221, subroutine C (denoted using numeral 114) stored at memory offset 0x291, and subroutine D (denoted using numeral 116) stored at memory offset 0x332. An empty space 118 for unused memory is shown below the original process 100. The process information 106 includes details for linking subroutines and libraries of the process. Subroutines A, B, C, and D are called by the main application 108.

In FIG. 1A, subroutine B includes an ROP gadget 120. An ROP gadget is a snippet (e.g., a few lines) of the original program code that typically includes assembly code for popping one or more registers off of the stack and return instructions to resume execution flow at an instruction following a call to a subroutine that includes the ROP gadget. An ROP gadget can be used to craft an exploit by a malicious attacker. For example, by manipulating ("stitching together") multiple ROP gadgets, a malicious attacker can put together a fake call stack to access secure data or take control of the process. An attacker generally identifies ROP gadgets by reverse engineering the original process and/or by analyzing the original process 100. Identifying an ROP gadget includes identifying memory addresses where the gadget resides and the instructions (assembly code) associated with the ROP gadget.

In the original process 100, subroutine B includes ROP gadget 120 at a memory location having an offset address 0x268. Through analysis and/or reverse engineering, an attacker having access to this program can identify this address and get to know the instructions stored at this address. For example, the attacker can repeatedly string together ROP gadget 120 (and possibly other ROP gadgets in original process 100) to access secure data or take control of original process 100.

To prevent access to the ROP gadget 120, a transformation can be performed such that the transformed process 102 has perceivably identical functionality as the original process 100 but has a different (e.g., randomized) arrangement of code components when loaded into memory. The transformed process 102 includes in an ordered sequence: process information 106 stored at memory offset 0x000, subroutine A at memory offset 0x030, subroutine D at memory offset 0x100, main application at memory offset 0x150, subroutine C at memory offset 0x291, and subroutine B at memory offset 0x332. An empty space 118 for unused memory is shown below the transformed process 102.

The binary protection example shown in FIG. 1A utilizes a load-time randomization that creates different subroutine locations every time the process is loaded, even though the representation of the program in non-volatile storage doesn't change. As shown in FIG. 1A, the process information 106 continues to reside in the same location, however, as a result of transformation 124, subsequent code blocks have been randomly rearranged within the virtual memory. This randomization occurs each time the original process is loaded into memory. Thus, the arrangement of the code components changes each time the transformed process is loaded into memory. In some embodiments, the binary transformation system can make sure that pointers used in the process are accurately updated to reflect new subroutine locations after a randomization/transformation has been applied to a program. Further, for each additional subroutine in the program, the number of ways the program can be randomized grows exponentially.

As shown in FIG. 1A, in the transformed process 102, the ROP gadget 120 is located at memory offset 0x350, which is not known to the attacker. Thus, an attacker's attempt to access the ROP gadget 120 at location 0x268 (where it was initially stored in the original process 100) would place the program counter at a random point within the main application 108. Thus, an attack based on relying that the ROP gadget 120 is located at location 0x268 is likely to trigger an invalid state system response. Because code blocks get randomly arranged each time the transformed process 102 is loaded into memory, ROP gadget 120 can be located at any arbitrary location in memory. Hence, in the event of a ROP attack, the program enters an invalid state. Non-limiting examples of error conditions that lead to an invalid state include the process performing a memory access violation, the process executing an illegal operation code, or otherwise the process causing memory corruption. In some embodiments, the present technology is directed at minimizing loss of data and/or service due to memory corruption. For example, by attaching specialized code (such as signal handlers) to a program, the present technology minimizes loss of data and service due to memory corruption. Although the discussions herein are presented for use cases where memory corruption occurs as a result of ROP attacks, the technology disclosed herein has broader applicability in that it can be applicable to any types of memory corruption, regardless of whether or not a ROP attack has occurred.

FIG. 1B presents an example of manipulating instructions of the original code to create an ROP gadget. The upper code block 130 of FIG. 1B shows a series of instructions (lines 1, 2, and 3) parsed by the processor starting at address 0x000359b and in the way the developer intended. The lower code block 132 of FIG. 1B shows the memory contents if the memory locations are shifted by one byte starting at address 0x0000359c instead of 0x0000359b. If the processor is directed to bypass the first byte 0x80 (shown with block 131 in FIG. 1B) of op code 803d5e7b000000, then the op code in lines 1, 2, and 3 of block 130 in memory correspond to an entirely different set of instructions. In other words, if the processor is directed to bypass byte 0x80 (shown with block 131 in FIG. 1B) of op code 803d5e7b000000 is ignored, then instructions in block 132 are executed instead of the instructions in block 130. Attackers use this to their benefit by searching through a program's memory space for bytes that accomplish some functionality they desire, such as assigning a value to a register or calling a function; chaining a series of them together; and then finally using that chain for executing an exploit against a memory corruption vulnerability. This shows an example of how ROP gadgets can be created by attackers.

An abridged program residing in memory, shown in part as FIG. 1C through 1E, shows a vulnerability that can be targeted by a buffer overflow. ROP gadgets identified as A, D, and memory block E, may be combined by an attacker when exploiting the vulnerability. FIG. 1F details the process of stringing those components together into an attack sequence.

Line 4 of FIG. 1C shows a function named "system" (A). The "system" function has one input, which is register edi. Line 3 of FIG. 1C shows the developer intended memory location 0x4008ff being copied into register edi—the register used to tell the system function what program to execute. The text at memory location 0x4008ff (block B in FIG. 1C) as being "/bin/ls". During unperturbed execution, this program would run an "ls" command when line 4 of FIG. 1C is executed.

FIG. 1D shows a variety of legitimately parsed instructions, including two instructions that comprise the first ROP gadget, which exists "in between" lines 7 and 8 (shown as block C in FIG. 1D). Similar to the Op Code offset which changed the upper code block 130 (and lower code block 132) in FIG. 1B, in lower code block 138 of FIG. 1D the processor starts executing one byte past the start of line 7 from the upper code block 136 of FIG. 1D (5f vs. 415f), resulting in a different instruction (D) being available for execution. FIG. 1E shows the string "/bin/cat flag.txt" (E) existing in the application data, which will be used by the ROP gadget D in FIG. 1D to set the rdi register. Registers rdi and edi are the same physical circuits in the processor but are used for 64-bit and 32-bit operations respectively.

The attack sequence shown in FIG. 1F lays out the complete ROP chain, which is the combination of all ROP gadgets, and any additional data needed to carry out the exploit. Components from FIG. 1C through 1E will be used to build the ROP chain and an attacker will send this ROP chain as data to the program.

As shown in Attack Sequence 1F, initially the attacker will load a specific number of random bytes onto the stack to first, trigger the buffer overflow, and secondly, to make sure the pointers to the ROP gadgets are correctly aligned and in the right place on the stack to be processed as instructions. The attacker will then load the edi/rdi register (Gadget D) with the contents of memory at 0x601060 (Gadget E), which contains the string "/bin/cat flag.txt," which is the command the attacker wants to execute on the system. Finally, the call to the "system" function (Gadget A), which now calls the cat program to write the contents of the flag.txt file to the screen, instead of the "ls" program that the developer intended.

A binary protection system would keep this ROP chain from working because the attacker would not be able to determine the gadget locations. The jump to 0x400883 could result in an illegal instruction or other interrupt triggering event. The system of present disclosure would allow for collection of forensic information around the attempted attack, even though the attack was not successful.

Figure 1G:
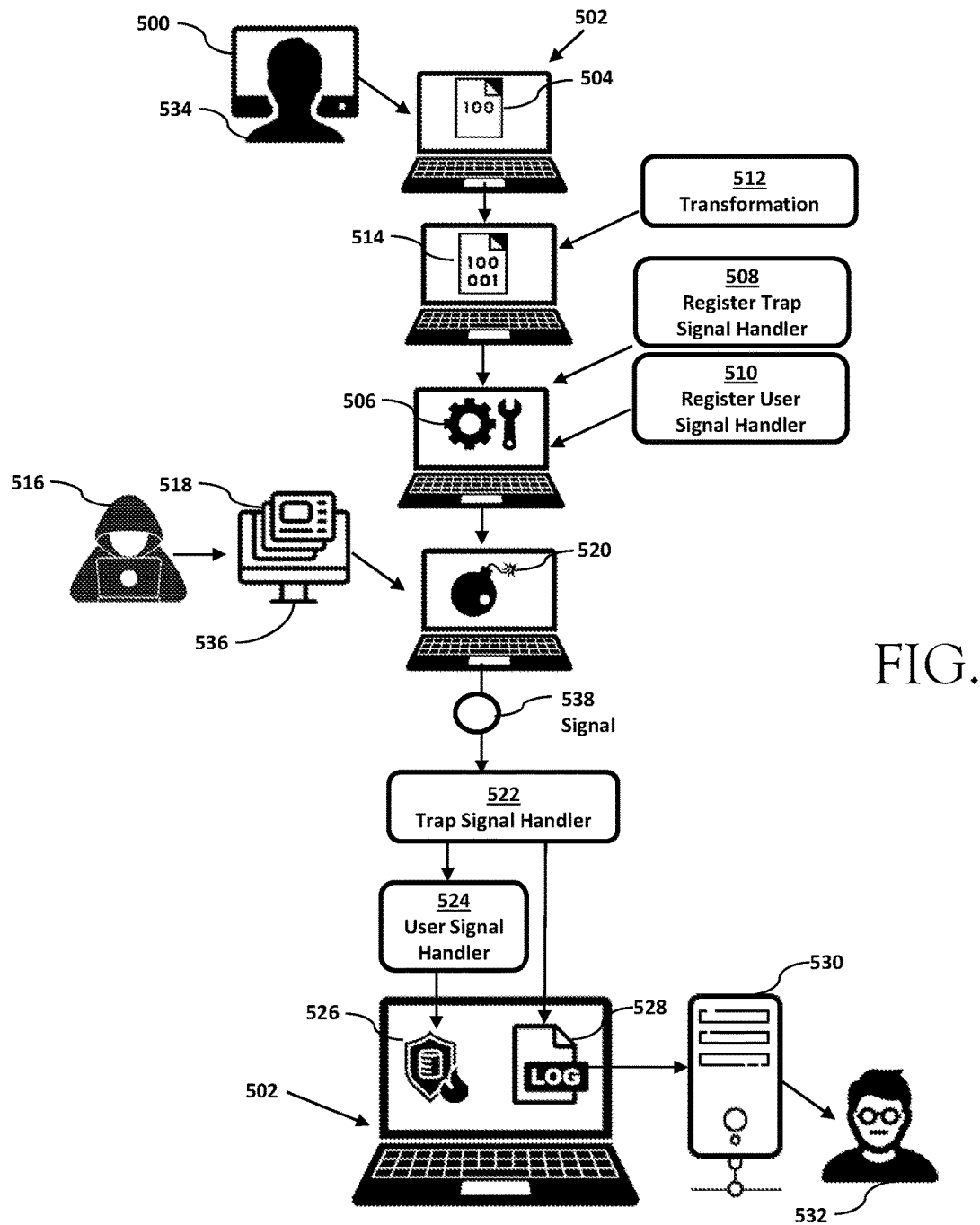
FIG. 1G shows a system interaction block diagram from a user's perspective, in accordance with an embodiment of the present disclosure.

FIG. 1G shows the system interaction of the technology from a human perspective during an attack by a malicious actor. In presenting this scenario, there are three roles shown: the user 534, the network administrator 532, and the hacker 516.

The role of the user 534 is to initiate a third-party application 504 to run on a target machine 502. Initiating the application may be accomplished any variety of ways, such as remotely through a terminal 500, as shown, loaded directly on the target machine 502 by a user, loaded by a parent executable, or loaded through a scripted file.

Signal handlers are the pieces of code which, once registered with the operating system, handle the memory corruption events. Within the context of FIG. 1G, there are two signal handlers which exist, the first being the trap signal handler 522, which is unique to this disclosure, and the second potentially being the user signal handler 524.

In some embodiment the transformation 512 of the third-party application may take place prior to registration of the signal handlers 508 and 510. This step involves the restructuring the third-party application 504 to create a functionally equivalent version shown as 514. In an alternative embodiment, this step may occur after to the registration of the trap signal handler 508 or be non-existent. As the location of the user signal handler 524 may be obfuscated by the transformation 512, registration of the user signal handler 510 should occur after transformation 512. For the purpose of presenting the art by example within the scope of FIG. 1G, the disclosure refers to the process to represent either the third-party application or the transformed third-party application.

In most cases, the next step includes registration of the signal handlers 508 and 510. When the user signal handler 524 exists, the user signal handler may present opportunities to cleanly exit and minimize data loss or loss of service. A configurable setting 506 may exist to alter the registration of the signal 538. In the preferred embodiment, first, the trap signal handler 522 is registered 508 with the kernel via methods described within this disclosure, and then if the third-party application includes a user signal handler 524, the user signal handler may be registered 510 with the trap signal handler 522. In an alternative embodiment, both the trap signal handler 522 the user signal handler may be registered 510 with the kernel. In another embodiment, elements within the configuration setting 506 may be used to enable or disable response to select signals 538.

The configuration settings 506 may also include a set of known transformation tools or signals which may be incompatible with the signal registration process, and if detected on the target machine, the system may provide a notification and require user 534 or system administrator 532 intervention before continuing. In some embodiments where transformation tools are present on the target system, preloaded, or called by the process, the system waits until the transformation is completed prior to registering the signal handlers.

The process continues by running the desired functional tasks of the third-party application such as database management, mathematical routines, spreadsheets, word processing, etc.

While the process is running on the target machine 502, a hacker 516 begins an attack of the process. As a non-limiting example, an ROP attack using a series of pre-identified ROP gadgets 518 associated with the process are executed. These attacks may be performed using a variety of access points such as a remote terminal 536, the user terminal 500, or the target machine 502. These attacks cause a memory corruption event 520. Alternatively, the memory corruption event 520 may also be caused by an event other than a malicious attack.

Memory corruption represents an event that occurs in a computer program when the contents of a memory location are modified due to programmatic behavior that deviates from the intention of the original programmer or program/language constructs. Various types of memory corruptions can cause a central processing unit (CPU) or memory management unit (MMU) to flag an invalid or illegal state. One type of a memory corruption, which produces a response from the processor is a segmentation fault. A segmentation fault occurs usually when a program is attempting to access a non-existent memory address, memory the program does not have rights to, or attempting to write into read-only memory. In the event of a memory corruption, a processor can generate a response by sending a signal to the program. Examples of signal responses for segmentation faults can include SIGSEGV on a Linux or Unix system and STATUS_ACCESS_VIOLATION on a Windows operating system. Other events which can result in memory corruptions on a Linux system include bus errors resulting in a SIGBUS signal, illegal instruction errors resulting in a SIGILL signal, and floating-point errors resulting in a SIGFPE signal.

Within the target machine 502, the memory corruption event is followed by a hardware generated exception resulting in a signal 538 being sent to a signal handler. Depending upon the signal handler registration processes 508 and 510, and possibly configuration setting 506, the introduction of the signal 538 may have varied outcomes.

If the signal 538 is registered to the trap signal handler 522, then the trap signal handler 522 will be processed. The trap signal handler 522 may perform a variety of notification tasks, either singularly or in conjunction, including: creating a log file 528, directly or indirectly notifying the user 534 or system administrator 532, interacting with a security information and event management system or SIEM 530. The SEIM 530 may reside locally on the target machine 502 or remotely networked as shown. Furthermore, if the signal corresponds to an event wherein the third-party application 504 has accommodation for handling the signal 538, the trap signal handler 522 may hand-off control to the user signal handler 524. The user signal handler may include methods 524 to minimize data loss or possibly exact steps to return to normal program execution. In cases where the user signal handler 524 does not exist, the process will terminate following the notifications.

Either the system administrator 532 or user 534 may take the necessary actions to respond to the notification. In some cases, this may include restarting the process, rebooting the target machine, or investigating access system logs to identify potential threats.

Figure 2:
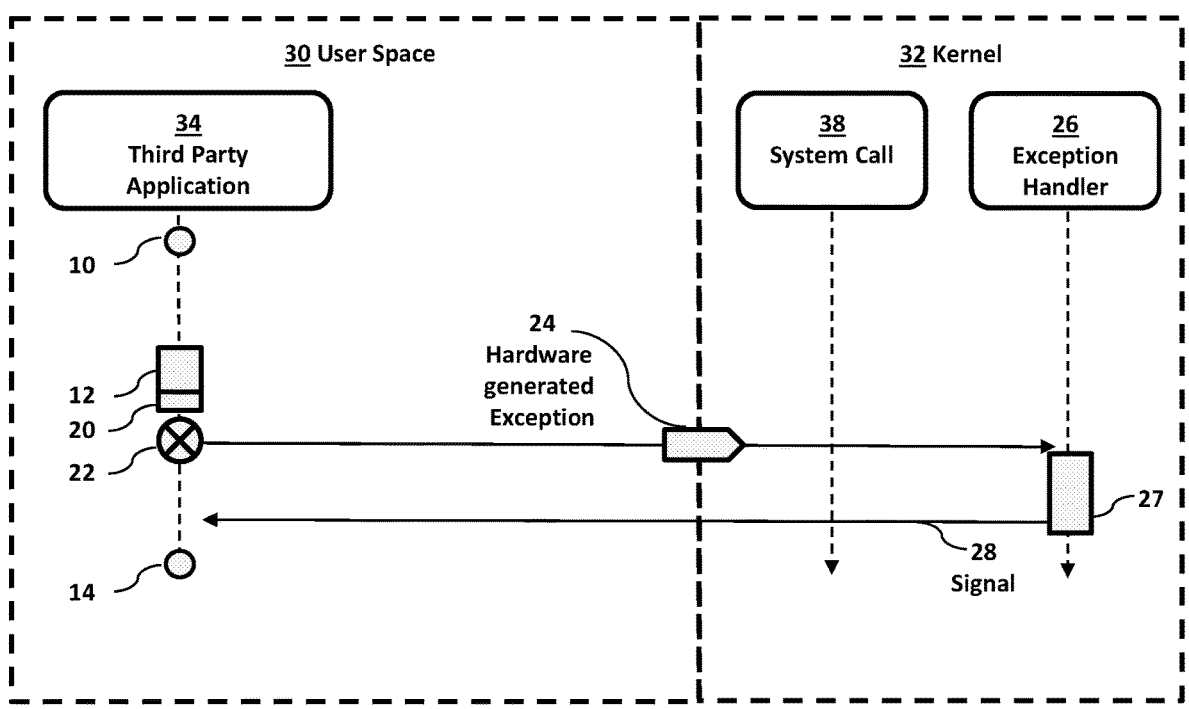
FIG. 2 shows a first example of system response block diagram to an invalid state in conventional designs.

FIG. 2 is a flow diagram of the typical system response block diagram in conventional designs to a memory corruption that results in an invalid state. A boundary is shown to illustrate functional blocks residing in the user space 30 and the kernel space 32. Under desirable conditions, a third-party application 34 (e.g., a third-party application or a target in running memory) will carry out normal execution 12 from start point 10 to end point 14, regardless of whether the process is an original process 100 or a transformed process 102.

During normal execution 12, if a third-party application 34 incurs a memory corruption 20, then the CPU enters an inconsistent or invalid state 22. The invalid state 22 may be the result of an unsuccessful ROP attack on a transformed process, where a hacker has attempted to access a known ROP gadget from an original process and inadvertently caused the CPU to begin execution at an unknown memory location (e.g., in the transformed process). When execution begins at an unknown memory location, in most cases, the CPU executes an illegal or invalid instruction and transitions to an invalid state 22. From the invalid state 22, the CPU can trigger a hardware mechanism to generate an exception 24 which is passed onto the Exception Handler 26 in the kernel 32 of the operating system. Examples of exception 24 include segmentation faults access errors, bus errors, and illegal instruction errors. The Exception Handler 26 is a part of the operating system at the kernel level 32. Block 27 represents the function within the Exception Handler 26 which checks the exception to determine if the third-party application 34 has registered a signal handler prior to sending a signal 28 (e.g., a response to hardware exception 24) from the kernel 32 to the third-party application 34 in the user space 30. Examples of equivalent signals 28 across operating systems include SIGSEGV on a Linux or Unix system and STATUS_ACCESS_VIOLATION on a Windows system. Other Linux specific signals of interest include a SIGBUS signal, a SIGILL signal, or a SIGFPE signal. The example in FIG. 2 is directed at a case where the third-party application 34 has not registered a signal handler in the user space 30 to handle response signal 28. As a result, the operating system will typically terminate or end 14 the third-party application 34 by default.

Thus, it will be appreciated that it would be of great interest to the user or system administrator to know more about the event that caused the termination or crash. In addition, a controlled response to a memory corruption 20 may allow the third-party application 34 the ability to exit gracefully and possibly saving or recovering user information or data, as opposed to an abrupt crash termination as shown with the conventional design of FIG. 2. Embodiments of the present technology are directed at addressing the above-mentioned problems.

Figure 3:
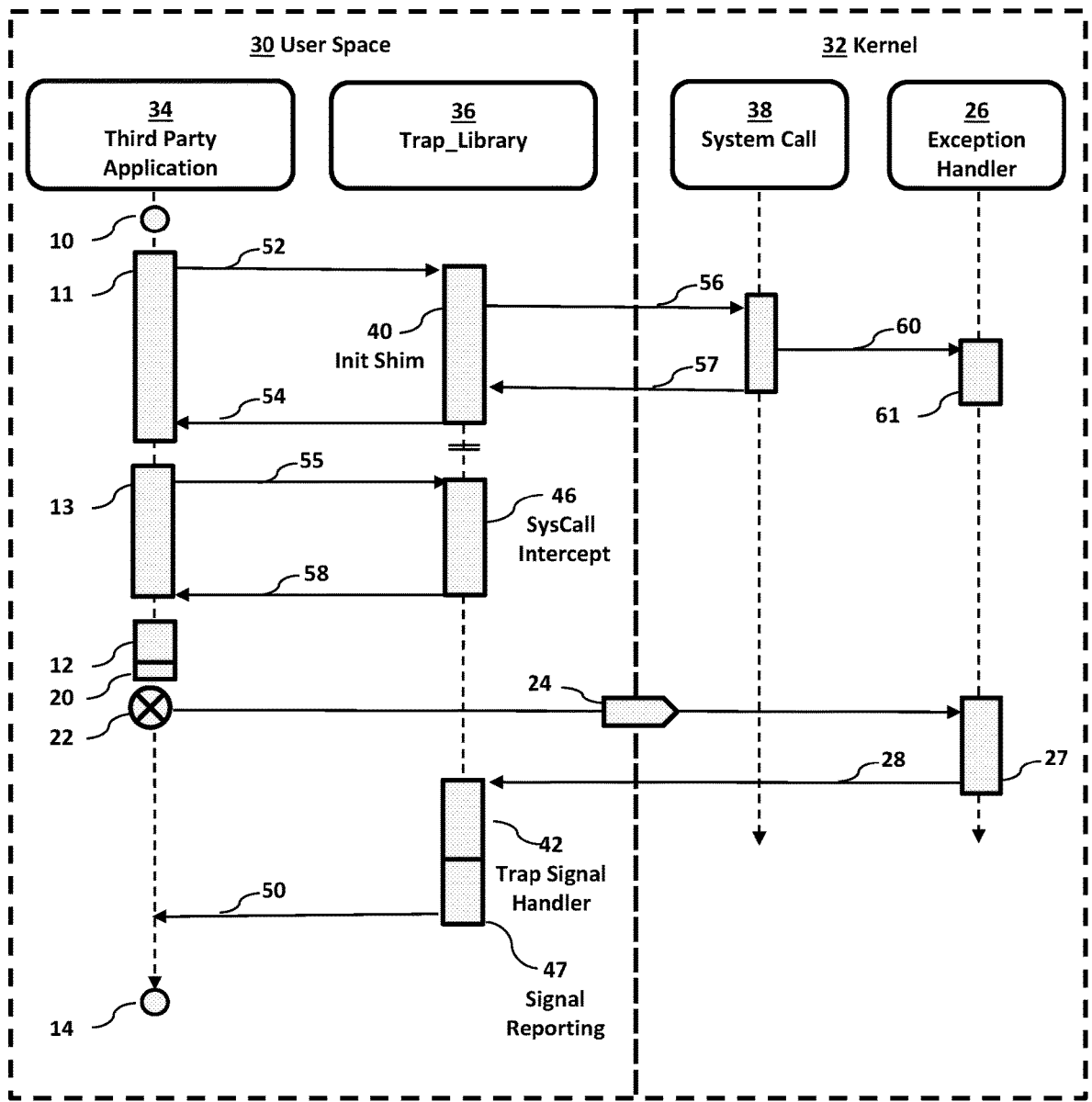
FIG. 3 shows a second example of a system response block diagram to an invalid state, in accordance with an embodiment of the present disclosure.
Figure 5:
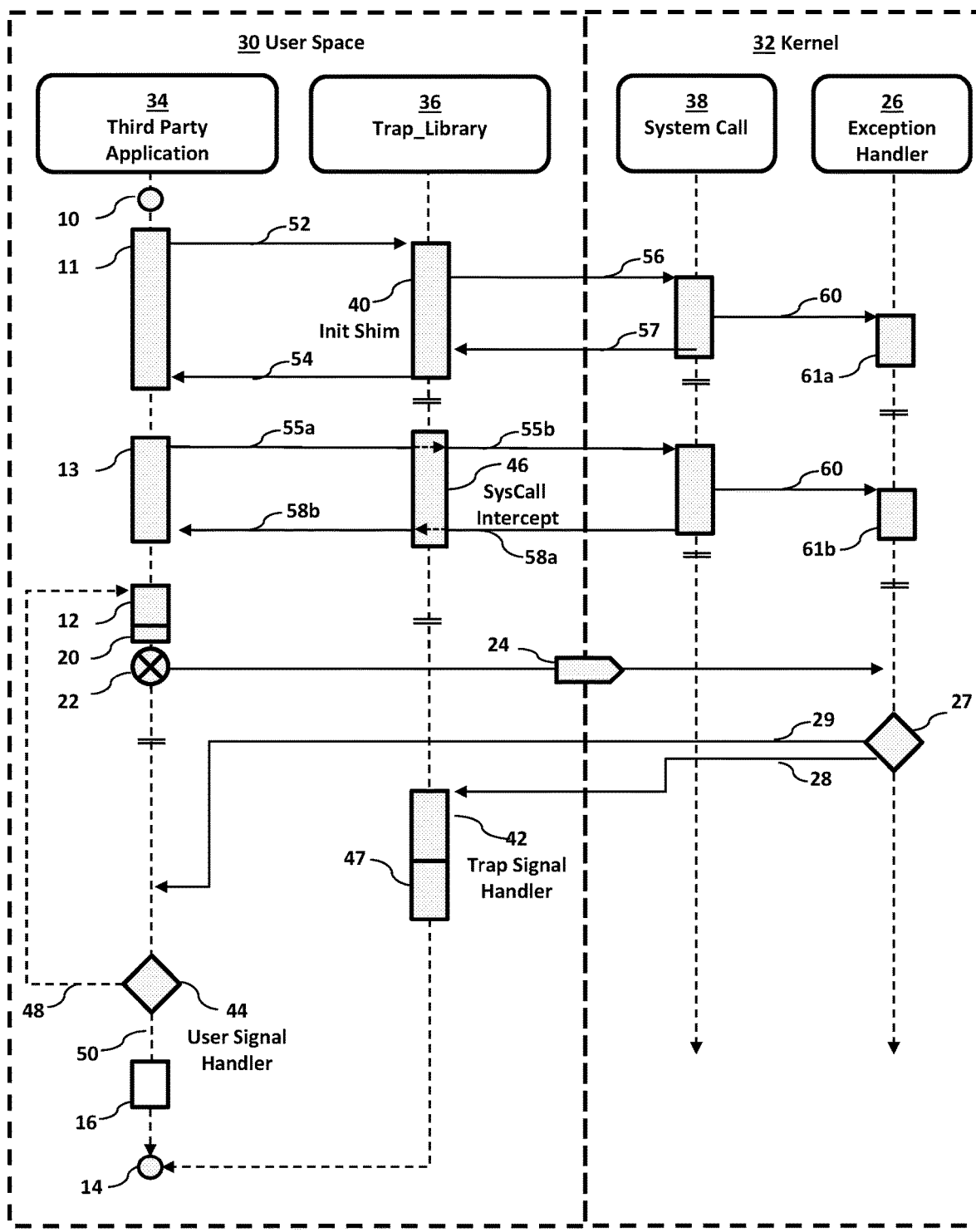
FIG. 5 shows block diagram to an invalid state, in accordance with an embodiment of the present disclosure
Figure 6:
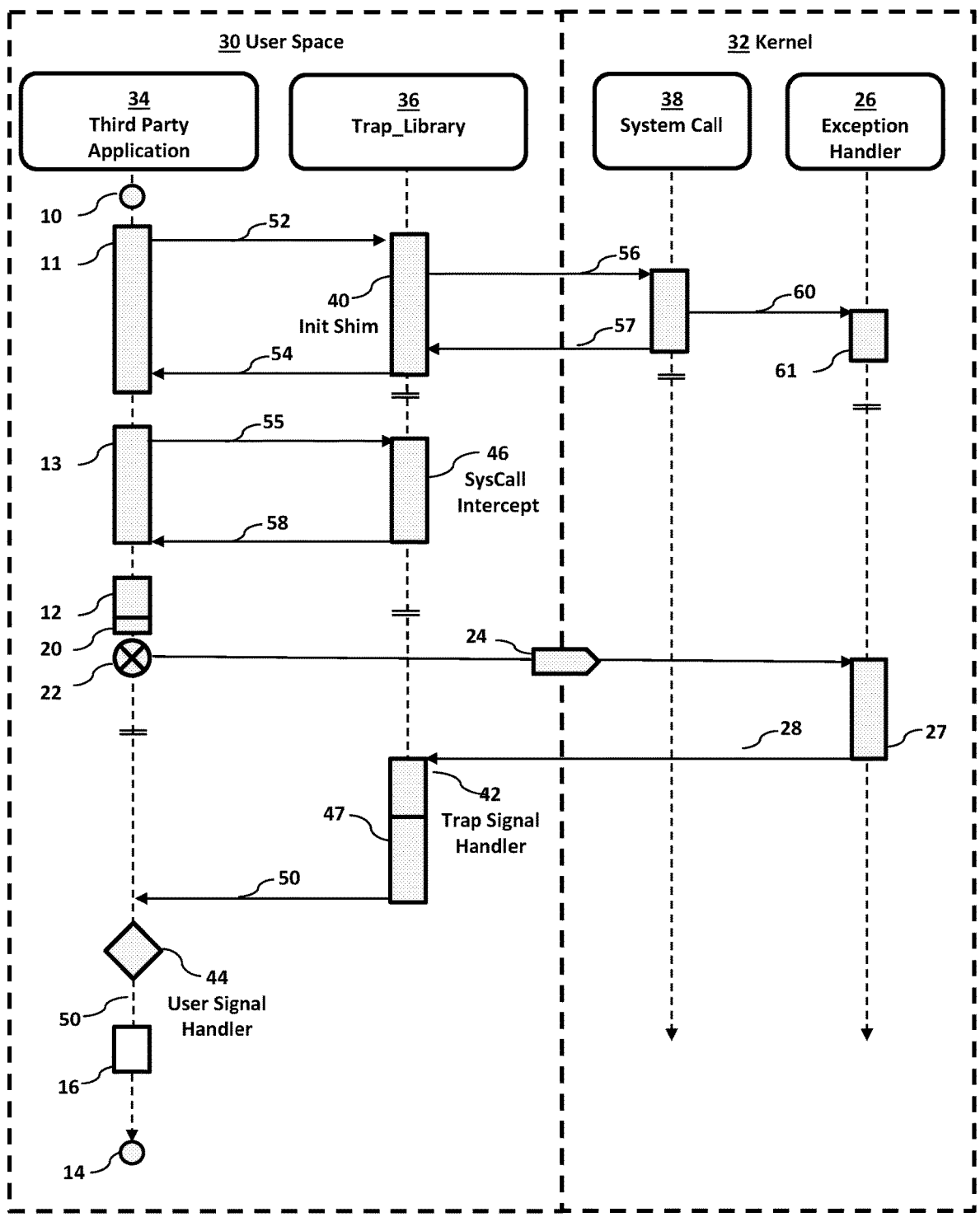
FIG. 6 shows a fifth example of a system response block diagram, in accordance with an embodiment of the present disclosure.

The present disclosure describes multiple embodiments where the existing program is configured to utilize program-defined or developer-intended error handlers. For example, FIG. 3 shows the Single Error Handler, FIG. 5 shows the Superseding Error Handler Method, and FIG. 6 shows the Multiple Concurrent Error Handler Method.

The Single Error Handler Method is characterized as having no interaction with developer-intended error handlers. The disclosed Trap Signal Handler 42 shown in FIG. 3 is the (only) single error handler for third party application 34.

The Superseding method would be used when exceptions may occur as part of normal program execution, which the developer-intended error handler would resolve before resuming normal execution, and which should not trigger an error reporting process. It is called the Superseding method because the developer-intended error handler would supersede the error handler described in the present disclosure.

The Multiple Concurrent method is used when the developer-intended error handler is intended to mitigate an error but not recover fully from it (e.g., saving data to disk or synchronizing a database before terminating), in which case the capabilities of the present disclosure would still be desired. The Multiple Concurrent method is so named, because the system of present disclosure is one of several concurrently registered error handlers for the program.

FIG. 3 shows an example of system response block diagram to an invalid state in accordance with some embodiments of the disclosed technology. The Trap Signal Handler 42 is integrated as a part of a library (Trap Library 36) into the user space. The disclosed Trap Library may include three functional blocks: the Initialization Shim (Init Shim 40 block), the SysCall Intercept 46 block, and the Trap Signal Handler 42 block. The Trap Signal Handler 42 blocks includes the signal reporting process 47. The Init Shim 40 registers the Trap Signal Handler 42 with the Kernel 32. As a result of the registering the Trap Signal Handler 42 with the Kernel 32, the Trap Signal Handler 42 and subsequent Signal Reporting 47 is executed in the event of a memory corruption 20. The Trap Library 36 can exist in the user space 30 and may be brought into memory through various methods including library preload, being dynamically linked into the source process as a dependency or compiled into the process binary. Also present within the user space 30 is the third-party application 34.

The SysCall Intercept block 46 can be a library, or part of a library, that transparently intercepts calls to the operating system and changes the arguments passed, handles the operation itself or redirects the operation elsewhere. Thus, the SysCall Intercept block 46 can provide layered-ness and modularity of the code. The behavior of the SysCall Intercept block 46 depends on which method the user has chosen for interacting with developer-intended signal handlers.

Stepping through the system response diagram of FIG. 3, the third-party application 34 begins at the start block 10. Although not a requirement of the disclosed technology, the illustrative examples used in this document are based on the third-party application 34 being a transformed process.

The third-party application 34 will register the Trap Signal Handler 42 with the Exception Handler 26 as early as possible (e.g., prior to normal execution of third-party application 34), so that should memory corruptions 20 arise, the signal 28 resulting from the memory corruptions 20 can be passed from the kernel 32 to the Trap Signal Handler 42. The steps to accomplish the registration of the Trap Signal Handler 42 are illustrated in FIG. 3. After the start 10 of the third-party application 34 and prior to normal program execution 12, the initialization shim 40 subroutine is called by the loader 11 via transition path 52. Loader 11 can include initialization instructions of Third Party Application 34. In some embodiments, the Init Shim 40 is given the "constructor" attribute, meaning that the operating system (OS) will execute the Init Shim 40, before the function main ( ) is called. The address of the Trap Signal Handler 42 is known to the initialization shim 40 and is sent into the kernel 32 via transition path 56 through a system call 38. The address of the Trap Signal Handler 42 is available to all functions within the library as a label that is updated by the linker when the library is built or updated by the loader. For example, when the loader brings the library from the disk into memory, the loader can identify the address of the Trap Signal Handler 42 in memory. The flow of the third-party application 34 returns back to the initialization shim procedure 40 via transition path 57 and subsequently returns back to the loader 11 via transition path 54, and proceeds to normal program execution 12. Autonomously within the kernel 32, the system call 38 registers the address of the Trap Signal Handler 42 via path 60. The address of the Trap Signal Handler 42 is registered with the Process Information Structure block 61, which is associated with the Exception Handler block 26. The Process Information Structure includes data, (not code) and its internal details typically varies across operating systems.

Per the definition of the Single Error Handling Method, the Trap Signal Handler 42 is the only signal handler that exists within the user space. In some cases, the Third Party Application 34 may have been created with a user defined signal handler which it would attempt to register with the operating system as shown by block 13. When the third-party application 34 attempts to register (via path 55) the user signal handler with the kernel, the SysCall Intercept 46 prevents the attempted registration from successfully reaching the system call 38 block. A false interface to intercept the registration of the user signal handler may be accomplished by loading and thereby overriding the operating system C library function for the system call. It is termed false because we override certain standard library functions without the original program's knowledge, so that when the developer attempts to make a system call, the SysCall Intercept 46 function is called instead. To access the original C library functions, and thus bypass the false interface, a dlsym system call may be utilized to reach the original C library function residing in the dynamic library.

Subsequent to registering the Trap Signal Handler 42 with the Exception Handler 26, if an error condition (such as a memory corruption 20) is encountered during normal execution 12, the CPU will flag an invalid state 22 as part of the error handling the memory corruption 20. The CPU assigns the exception 24 associated with the invalid state 22, which is passed to the Exception Handler 26 residing within the kernel 32. Unlike the previous example in FIG. 2, in the embodiment disclosed in FIG. 3, the address for the Trap Signal Handler 42 has been registered with the Exception Handler 26, and as a result, the exception 24 can be managed at block 27. For example, in response to the exception, the block 27 sends the signal 28 to the Trap Signal Handler 42 and not directly to the Third-party application 34. The signal 28 is received by the Trap Signal Handler 42. In some embodiments, the signal 28 received by the Trap Signal Handler 42 is reported via the signal reporting process 47 prior to returning to the user third-party application 34 via path 50. (In some cases, which will be addressed later, the third-party application may have means to handle fault conditions allowing the third-party application 34 to recover.) The third-party application 34 of FIG. 3 does not have any signal handler of its own, and hence the memory corruption 28 is determined to be non-recoverable. Flow returns to the third-party application 34 via the non-recoverable path 50, the program aborts, and flow reaches the end block 14.

The signal reporting process 47 can manage the signal 28 according to multiple ways. In one embodiment, the signal reporting process 47 includes logging information associated with the fault/memory corruption and auditing the historical information of the logs. The logs may be stored locally on the system or synced to a remotely location. In another embodiment, the signal reporting process 47 includes reporting to a SIEM or security incident and event management tool (SIEM). In another embodiment, the signal reporting process 47 includes utilizing an interrupt handler in the kernel. In some embodiments, the interrupt handler in the kernel can override or modify the behaviour of the exception handler 26.

Beyond the scenario where the system is corrupted by a malicious cyber attack, it is also possible that the crash is due to a common memory corruption bug existing in the application. To provide greater understanding of the error condition, the signal reporting process 47 can perform an audit looking for evidence to support either a perceived cyber attack or a non-threatening memory corruption bug in the software. In assessing the cause of the memory corruption 20, some signals are more likely to be associated with an attack while others are common errors.

The memory corruptions most likely associated with an attack are SIGILL, SIGBUS, and SIGSYS, all of which are not likely to appear from executing "well-formed code." Another type of memory corruption is "RSP outside stack area", which indicates a stack corruption where the current instruction is an invalid return instruction and is also likely a stack corruption. The memory corruptions which are not usually associated with an attack are Null Pointer Dereference (a common application bug) and SIGFPE (commonly arising as a result of non-validated input).

Additional examples of useful information which may be included in the log files or sent to the SIEM tool by the signal reporting process 47 include: the processor register state at the time when signal 28 was generated, stack backtraces, a type of signal 28, and information about the transformed binary.

Figure 4:
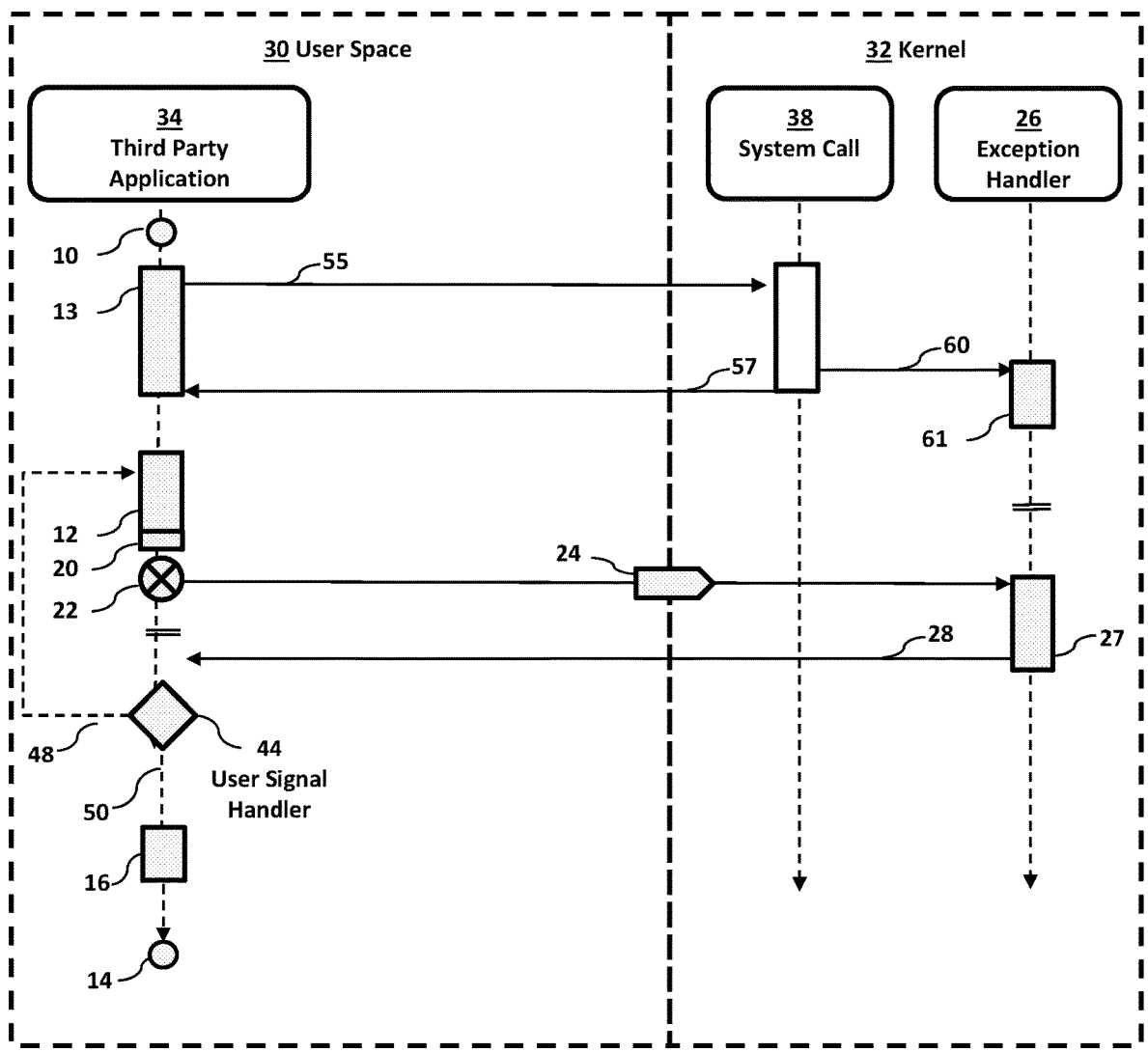
FIG. 4 shows a third example of a system response block diagram to an invalid state in conventional designs.

FIG. 4 shows an example of system response to an invalid state. In some conventional designs, e.g., as shown in FIG. 4, a third-party application 34 may already be designed to handle certain error conditions 20. For example, as shown in FIG. 4, by integrating a signal handler 44 into the program, the user signal handler 44 can handle error conditions as opposed to simply terminating the process. The user signal handler is a function in the program, which runs in user space. In some implementations, the user signal handler can be registered with the OS by passing its address (along with other information that varies depending on the specific OS) to the kernel by making a system call.

After the start 10 of the third-party application 34, the program registers the address of a user signal handler 44 with the Exception Handler 26. The process to register the address of a user signal handler 44 with the Exception Handler 26 is similar to the description provided in FIG. 3 The address of the user signal handler 44 is sent to the kernel 32 from block 13 via transition path 55 to a system call. Following the call, the flow returns back via path 57 and proceeds to normal program execution 12. Autonomously within the kernel 32, the system call 38 registers the address of the User Signal Handler 44 with various signals 28 of interest at block 61 via transition path 60.

Upon encountering a memory corruption 20, the CPU enters an invalid state 22, triggers an exception 24, and passes the exception 24 to the Exception Handler 26. Because the user signal handler 44 is registered with the Exception Handler 26, signal 28 arising from Exception Handler 26 are sent to the user signal handler 44 as opposed to simply terminating the process.

Within the user signal handler 44, the third-party application 34 determines if the fault is recoverable or non-recoverable. If the program determines that the fault is recoverable, then the flow may transition via path 48 back to the normal program execution 12. As a result, upon encountering a recoverable fault, the flow reverts back to the normal program execution 12. For example, to recover from an error condition arising from a divide-by-zero error condition, the program may be designed to substitute a substantially large value as a substitution for a divide-by-zero error condition.

However, if the user signal handler 44 determines that the fault is non-recoverable, then the flow may transition via path 50 to the clean-up block 16 prior to termination 14. As an example of a non-recoverable fault, consider a large database which may have exceeded its buffer size by one entry. The program may be designed to allow the database to be saved in its previous form to a file before abruptly exiting, thus, minimizing loss of service. Thus, the clean-up block 16 provides a clean-up operation to minimize loss of service.

The present disclosure is an improvement over the prior art because it adds error handling to third party programs lacking error handlers. The vast majority of modern software is assembled from previously written components (e.g. open source software). Programmatically adding error handling into software can be a challenging task. Further, vulnerabilities exploited by attackers generally originate in open source software components that are added into third-party application. However, most open source software does not include error handlers in the source. Additionally, with the application of binary transformations to third-party applications, errors that originally were not present in the third-party application gets introduced when an attacker tries to hijack a process. Therefore, by employing the methods disclosed in the present disclosure, system operators have the ability to detect attempted attacks on systems protected by a binary transformation system.

FIG. 5 shows the Superseding method, where Trap_Library 36 registers the Trap Signal Handler 42 and subsequently the third-party application 34 registers the user signal handler 44. Blocks 61a and 61b represent the events where the system call updates the lookup table of the exception handler 26. In this scenario, the Exception Handler 26 at block 27 will branch to the appropriate signal handler that is registered to handle the exception 24, e.g., either the Trap Signal Handler 42 or the User Signal Handler 44, depending on the type of exception 24. For example, depending on the preferences within a configuration file, the system can configure certain exceptions to be handled by Trap Signal Handler 42 and some other exceptions by the User Signal Handler 44.

As shown in FIG. 5, the Initialize_Shim 40 routine is called from block 11 of the third-party application 34. The Trap_Library 36 does not need prior knowledge if the third-party application 34 is configured with user signal handler 44 or not. Program execution returns to the third-party application 34 via path 54 upon registering exceptions associated with malicious ROP attacks with the Exception Handler 26 at block 61a.

The third-party application 34, having been designed with a user signal handler 44 to manage at least one type of signal, attempts to register the user signal handler 44 with the exception handler. As shown in FIG. 5, the attempt made via path 55a is intercepted by the SysCall Intercept block 46 by methods presented earlier as the false interface. In the case of the Superseding Method, the SysCall Intercept performs essentially a pass-thru operation in receiving the user signal registration information via path 55a and subsequently registering the user signal handler with the system call 38 via path 55b. The System Call 38 then completes the registration with the exception handler 26 at block 61b for signals the third-party application 34 is designed to manage. Program flow returns to the third-party application 34 via path 58a and 58b, and subsequently begins processing normal program execution 12.

In some embodiments, only one signal handler may be associated with multiple signals. In the embodiment shown in FIG. 5, the user registered exception may overwrite the signals registered by the initialize_shim 40 and cleanly return to normal program execution. As an example, the illegal instruction signal, SIG_ILL, may be an indication of an ROP attack and registered with the Trap Signal Handler 42, floating point errors, SIGFPE, may be a recoverable condition registered with the User Signal Handler 44, and a segmentation fault, SIGSEGV, may be a non-recoverable condition registered with the User Signal Handler 44.

Continuing with this example and with the scenario shown in FIG. 5, upon encountering a memory corruption 20 and entering an illegal state 22, the corresponding exception to the memory corruption is generated by the hardware. This exception 24 is passed to the Exception Handler 26 at block 27. The Exception Handler 26 cross references and matches the exception 24 with the appropriate signal handler within block 27.

Path 29 illustrates the response to an exception 24 in which the third-party application 34 registered the user signal handler 44. From the example scenario above, this would occur if the memory corruption 20 was associated with either a segmentation fault or a floating-point error signal. If the third party application executable program 34 was designed to recover from a floating-point error, then the third party application executable program 34 will resume normal program execution 12 via path 48. If the third party application executable program 34 was designed to cleanly exit from a segmentation fault, the third-party application 34 would perform clean-up processes in block 16 via path 50 prior to termination 14.

Path 28 illustrates the case in which the signal 28 corresponding to the exception 24 is sent to the Trap Signal Handler 42. As presented in the example, an illegal instruction signal would be processed by the Trap Signal Handler 42, logged by the signal reporting process block 47 prior to process termination 14.

FIG. 6 shows the Multiple Concurrent method where a user signal handler 44 is defined and will be utilized by the trap signal handler 42. In the multiple concurrent method, registration of the Trap Signal Handler 42 with the Kernel occurs via methods previously defined within block 11.

Attempts by the Third Party Application 34 to complete registration of the user signal handler 44 at block 13 are intercepted SysCall Intercept 46. Using methods described earlier the interception is accomplished by presenting a false interface to the Third Party Application and the user signal handler 44 information is cached so that it can later be called by the Trap Signal Handler 42.

As shown in FIG. 6, upon encountering a memory corruption 20 and generating the exception 24 by the CPU in response to the invalid state 22, the exception 24 is generated and sent to the exception hander 26. The exception 24 is processed by block 27 and the corresponding signal 28 indicating the cause of the memory corruption 20 is sent to the user space 30. Within the user space, as the Trap Signal Handler 42 was registered with the Exception Handler 26, the signal 28 is sent to the Trap Signal Handler 42. The Trap Signal Handler 42 performs the signal reporting process 47 of the memory corruption 20 and then passes the signal to the User Signal Handler 44. If the program has been designed for clean up 16 prior to exit, this is performed via path 50.

In some embodiments, based on user configuration settings, the Trap Signal Handler may be active after the User Signal Handler. In some embodiments, the Trap Signal Handler, which is user-configurable, may be bypassed entirely. In some embodiments, the Trap Signal Handler may be active before the User Signal Hander as described in FIG. 6.

Figure 7:
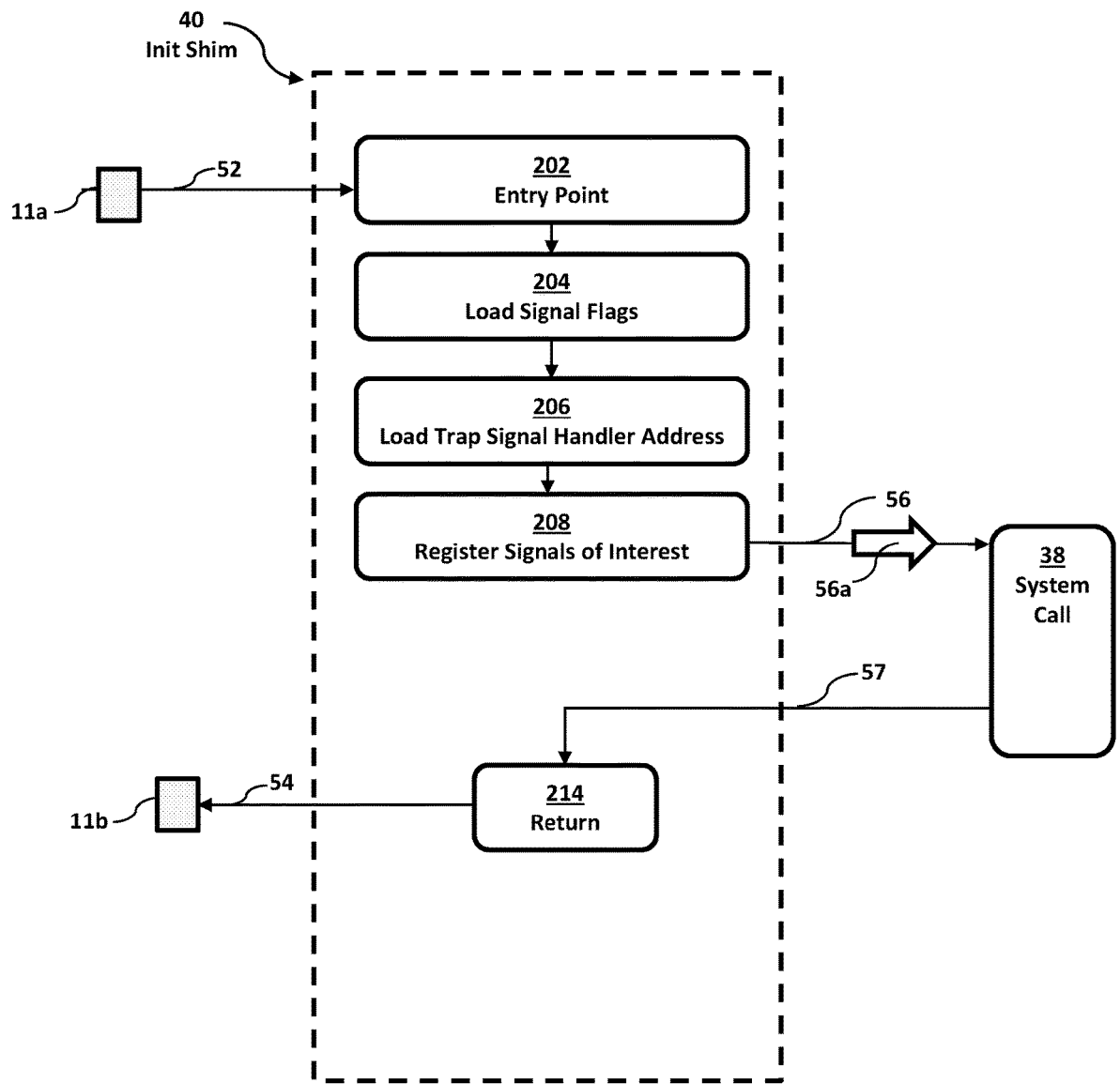
FIG. 7 shows a flow chart for registering the trap signal handler with the Kernel, in accordance with an embodiment of the present disclosure.

FIG. 7 is a flowchart of the Initialize Shim or Init Shim procedure 40 for registering the address of the disclosed signal handler with the OS kernel so that the signal handler can respond to signals of interest (e.g., signals associated with memory corruptions). Init Shim is a part of the Trap Library 36 and is called by the loader 11. In FIG. 7, the loader 11 is broken into the loader call 11a and the loader return 11b. The loader call 11a passes call parameters and enters (via path 52) into the Init Shim 40 subroutine at entry point 202. As part of the programming standard of the within the Linux operating system flags are assigned instructing the kernel how to handle each signal during the registration process. In order to enable active signal trapping, the flags are loaded with a value associated with constant SA_SIGINFO (a constant defined by the C Library) at block 204. At block 206, the address of the Trap Signal Handler is loaded into memory. At block 208, for each signal of interest, the address of the Trap Signal Handler and flag settings are passed as a parameter 56a via path 56 to the System Call 38. The System Call 38 returns via path 57. From the return block 214, the program flow passes back to the loader return 11*b* of the third-party application via path 54.

Figure 8:
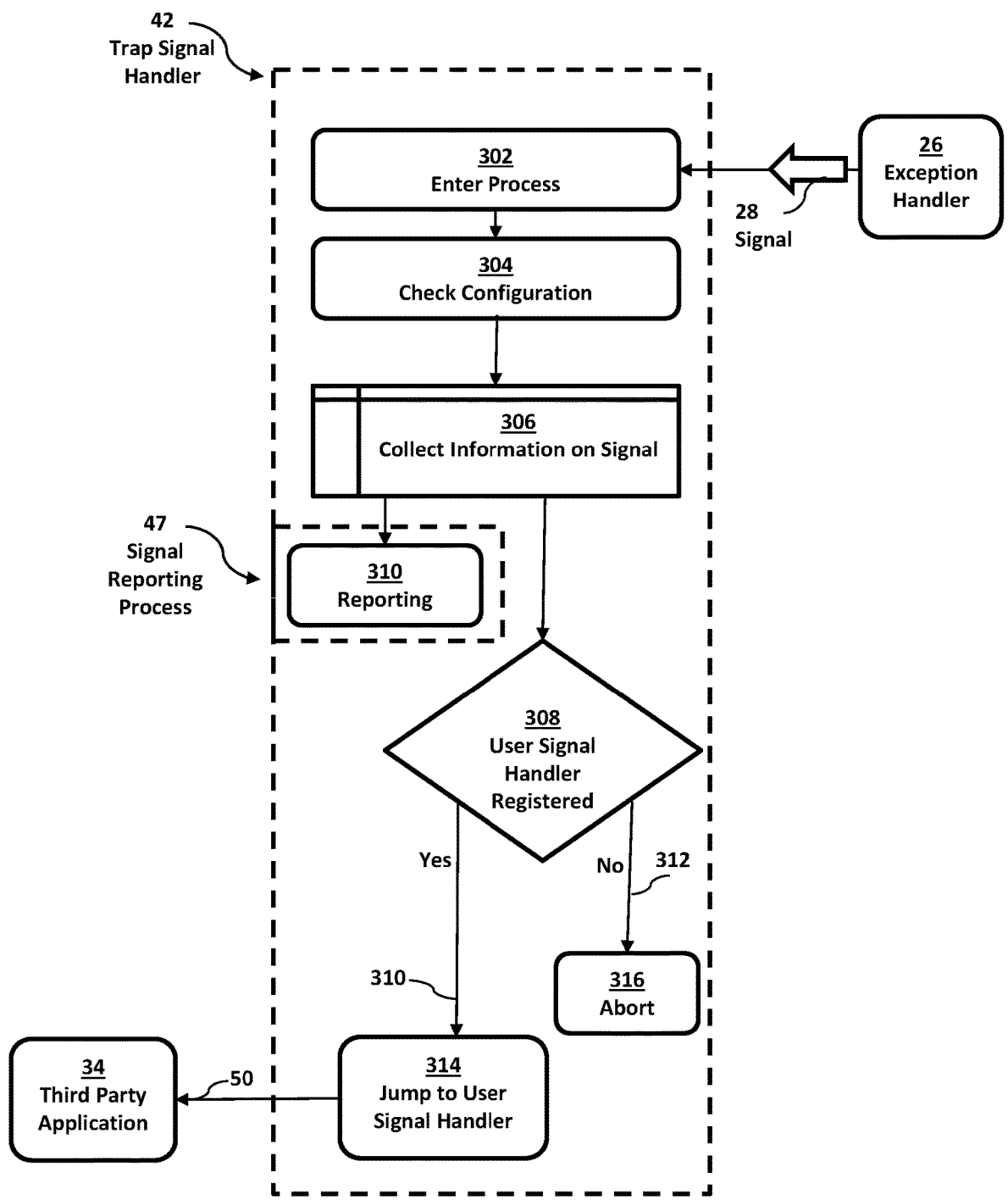
FIG. 8 shows a flow chart for management of the trap signal handler, in accordance with an embodiment of the present disclosure.

FIG. 8 show the flowchart of the Trap Signal Handler 42 for responding to signals of interest (e.g., signals associated with memory corruptions) and collecting information about the cause of the signal. The Trap Signal Handler 42 is a part of the Trap Library 36. A signal 28 is generated immediately after the exception handler 26 encounters an exception. If the address of the Trap Signal Handler 42 is registered with the signal 28, then the trap signal handler 42 process begins at Enter Process block 302. In some embodiments, the trap signal handler 42 may have a configuration 304 or settings defining specifics on how to handle a signal generated from an exception. The trap signal handler 42 collects information on the signal at block 306. In some embodiments, this information can include the signal, the address at which the exception occurred, the register states, as well as information about the environment such as the process, user data, time, date, etc.

In some embodiments, the signal reporting process 47, is opened as a child process of the signal handler as shown in FIG. 7. The information collected in block 306 is then reported in block 310. In this case, the signal reporting process 47 may terminate after reporting.

After collecting the signal information at block 306, the trap signal handler checks if the user signal handler is registered with the trap signal handler at block 308. For example, the user signal handler exists when the user signal handler has been registered with the trap signal handler 42 by the SysCall intercept. If the user signal handler exists and was registered for the present signal, the routine transitions from the decision block 308 to block 314, jump to the user signal handler. After jumping to the user signal handler (e.g., included in the third-party application 34) at block 314, the Trap Signal Handler procedure exits and returns back to the third-party application.

If the decision block 308 determines that the user signal handler does not exist for the present signal, the procedure exits, and the user process is aborted as indicated by the abort block 316.

Figure 9:
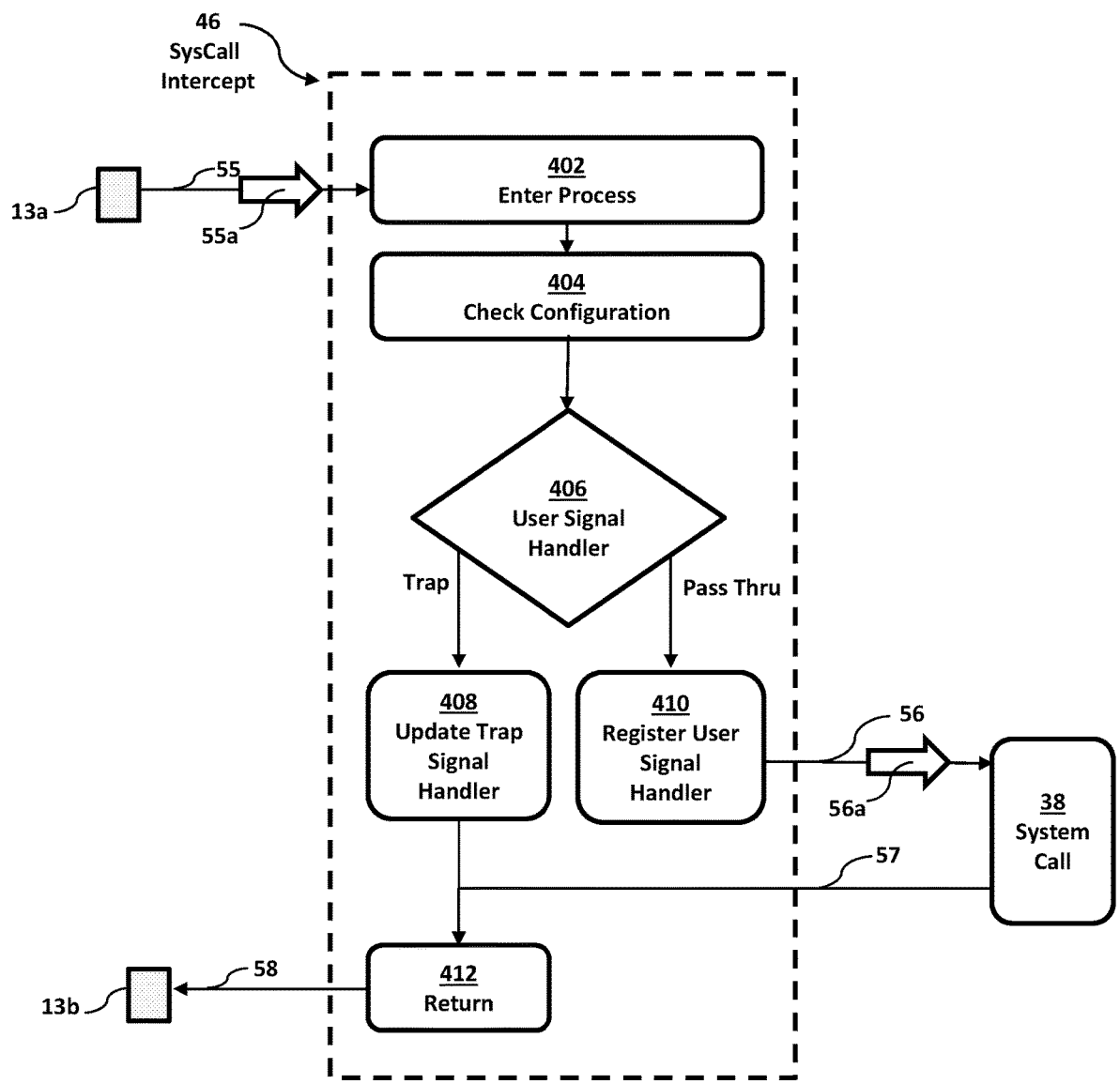
FIG. 9 shows a flow chart for intercepting requests to register the user signal handler, in accordance with an embodiment of the present disclosure.

FIG. 9 shows the flowchart for the SysCall Intercept 46 function. The SysCall Intercept intercepts attempts by the Third Party Application to register the user signal handler. In some embodiments, such as the Superseding Error Handling method, the function will complete the registration of the user signal handler. In other embodiments, such as the Multiple Error Handling method or Single Error Handling Method, the user signal handler is cached for possible use by the trap signal handler.

In FIG. 9, the user process caller 13 is broken into the caller instruction 13*a* and the return point 13*b*. The process is initiated by the user requesting a system call to register a user signal handler as represented by block 13*a*. The parameters 55*a* can include the signal type, and address of the user signal handler for the associated signal. The false interface to the kernel is able to intercept this system call and the associated parameters, thereby passing the parameters 55*a* into the SysCall intercept at block 402.

In some embodiments, including the Superseding Error Method, there may exist a configuration which enables the user signal handler to be registered directly with the Kernel, thereby passing through the registration and potentially overwriting any association for the Trap Signal Handler.

In other embodiments, including the Multiple Error Handling Method and the Single Error Handling Method, the user signal handler may be cached or registered with the Trap Signal Handler, thus allowing the signal to first be managed by the trap signal handler. Block 404 and 406 illustrates the decision path of checking the configuration and acting upon it by either trapping or passed through. In one embodiment, the configuration block 404 and decision block 406 does not exist, and the process flow proceeds to trapping the signal. In another embodiment, the configuration block 404 and decision block 406 does not exist, and the process flow proceeds to overwriting the trap signal handler.

To trap the signal, flow continues to block 408 where the signal is linked within the trap signal handler to the user signal handler address in order to be processed after the trap signal handler. The process continues to block 412 wherein the flow is returned to the user process at block 13*b*.

To overwrite the trap signal handler, the Syscall intercept 46 registers the user signal handler with the kernel for the signal as requested by the user process. The signal and handler are passed as parameters 56*a* to the System Call 38 and flow is returned via path 57. The process continues to block 412 wherein the flow is returned to the user process at block 13*b*. If this operation is done after the Init Shim, the trap system handler is overwritten for the specific signal.

Embodiments disclosed herein include a method for minimizing loss of service due to a memory corruption by attaching a signal handler (also termed herein as trap signal handler) to a third-party application. In response to memory corruption, the signal handler enacts a method, such as through creation of a log or reporting to a security information and event management system, to directly or indirectly notify a system user or administrator to take action.

Embodiments disclosed herein include a method for minimizing loss of service due to a memory corruption by attaching a signal handler (also termed herein as trap signal handler) to a third-party application that includes a user signal handler. When the user signal handler attempts to register with the kernel, the disclosed library presents a false interface to intercept the registration of a system call of the user signal handler. If the user signal handler lacks the ability to report and log memory corruption events, the disclosed false interface provides such a functionality.

Embodiments disclosed herein include a configuration setting which enables or disables the system response to a memory corruption. The configuration setting may include the ability to disable access to a third-party signal handler.

Embodiments disclosed herein include a method allowing user analysis of crashes due to memory corruption. For example, the disclosed trap signal handler collects a dump of the contents of registers and memory at the time of the exception to a file that can be analyzed in a debugger. The debugger, for example, can assess if the crash was the result of a failed attack or a mere program error.

Further, embodiments disclosed herein include a method for adding a trap signal handler to a third party application without modifying the source program or the binary. The trap signal handler can reside in a shared library which is loaded (using a method such as LD_PRELOAD on Linux) before the main binary is loaded. As a result of loading the trap signal handler, the signal handler can be registered with the kernel during initialization of the shared library.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media may include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments may be implemented as devices or modules using hardware circuits, software, or combinations thereof. For example, a hardware circuit implementation may include discrete analog and/or digital components that are, for example, integrated as part of a printed circuit board. Alternatively, or additionally, the disclosed components or modules may be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products. Accordingly, the claims set forth below should be construed in view of the full breadth and spirit of the present disclosure as described herein.

We claim:

1. A method for responding to an invalid state occurrence encountered during execution of a third-party application program, comprising:
   registering a trap signal handler with a kernel of an operating system;
   intercepting calls from the third-party application program to the operating system;
   processing an exception signal corresponding to the invalid state to generate a response, the response including performing a signal reporting process,
   wherein the signal reporting process manages information about the transformed third-party application program, and
   wherein information associated with the invalid state includes a processor register state at a time when the exception signal was generated, stack backtraces, and/or a type of the exception signal.

2. The method of claim 1, wherein the signal reporting process includes logging and/or reporting to a security incident and event management (SEIM) tool the information associated with the invalid state.

3. The method of claim 1, wherein the signal reporting process includes utilizing an interrupt handler in the kernel to override or modify the behavior of an exception handler module in the kernel.

4. The method of claim 1, wherein the signal reporting process includes determining whether there is evidence to support if the invalid state corresponds to a cyber attack.

5. The method of claim 1, wherein the processing the exception signal corresponding to the invalid state includes:
   receiving the exception signal from an exception handler module of the kernel; and
   collecting exception information on the exception signal, wherein the signal reporting process includes the collected exception information.

6. The method of claim 5, wherein the processing the exception signal corresponding to the invalid state further includes:
   determining whether a user signal handler is registered with the trap signal handler,
   wherein, if the user signal handler is registered with the trap signal handler, the exception signal is returned to the user signal handler in the transformed third-party application program, and
   wherein, if the user signal handler is not registered with the trap signal handler, execution of the transformed third-party application program is aborted.

7. The method of claim 1, wherein the registering the trap signal handler with the kernel includes:
   receiving call parameters via an entry point in an initialize shim procedure;
   loading a system flag with a defined constant, the system flag associated with a signal of interest for the invalid state;
   loading an address of a trap signal handler into memory;
   registering with a system call module in the kernel the address of the trap signal handler and settings of the system flag; and
   receiving a return value from the system call module.

8. The method of claim 1, wherein the invalid state corresponds to memory corruption.

9. The method of claim 1, wherein the intercepting calls from the transformed third-party application program includes:
   receiving a user signal requesting a system call to the kernel to register a user signal handler; and
   performing one of trap operation on the system call to allow the trap signal handler to process the user signal or a pass though operation that bypasses the trap signal handler.

10. A non-transitory computer-readable storage medium having stored thereon instructions for responding to an invalid state occurrence encountered during execution of a transformed third-party application program which when executed by a processor of an electronic device cause the processor to:
   register a trap signal handler with a kernel of an operating system;
   intercept calls from the transformed third-party application program to the operating system;

process an exception signal corresponding to the invalid state to generate a response, the response including performing a signal reporting process, wherein the signal reporting process manages information about the transformed third-party application program, and wherein information associated with the invalid state includes a processor register state at a time when the exception signal was generated, stack backtraces, and/or a type of the exception signal.

11. The non-transitory computer-readable storage medium of claim 10, wherein the signal reporting process includes logging and/or reporting to a security incident and event management (SEIM) tool the information associated with the invalid state, the invalid state corresponding to a memory corruption.

12. The non-transitory computer-readable storage medium of claim 10, wherein the processing the exception signal corresponding to the invalid state includes:

receiving the exception signal from an exception handler module of the kernel; and collection exception information on the exception signal, wherein the signal reporting process includes the collected exception information.

13. The non-transitory computer-readable storage medium of claim 10, wherein the registering the trap signal handler with the kernel includes:

receiving call parameters via an entry point in an initialize shim procedure;

loading a system flag with a defined constant, the system flag associated with a signal of interest for the invalid state;

loading an address of a trap signal handler into memory;

registering with a system call module in the kernel the address of the trap signal handler and settings of the system flag; and receiving a return value from the system call module.

14. An apparatus for responding to an invalid state occurrence encountered during execution of a transformed third-party application program, comprising:

memory; and a processor coupled to the memory and configured for:

registering a trap signal handler with a kernel of an operating system;

intercepting calls from the transformed third-party application program to the operating system;

processing an exception signal corresponding to the invalid state to generate a response, the response including performing a signal reporting process, wherein the signal reporting process manages information about the transformed third-party application program, and wherein information associated with the invalid state includes a processor register state at a time when the exception signal was generated, stack backtraces, and/or a type of the exception signal.

15. The apparatus of claim 14, wherein the signal reporting process includes logging and/or reporting to a security incident and event management (SEIM) tool the information associated with the invalid state, the invalid state corresponding to a memory corruption.

16. The apparatus of claim 14, wherein the processing the exception signal corresponding to the invalid state includes:

receiving the exception signal from an exception handler module of the kernel; and collecting exception information on the exception signal, wherein the signal reporting process includes the collected exception information.

17. The apparatus of claim 14, wherein the registering the trap signal handler with the kernel includes:

receiving call parameters via an entry point in an initialize shim procedure;

loading a system flag with a defined constant, the system flag associated with a signal of interest for the invalid state;

loading an address of a trap signal handler into memory;

registering with a system call module in the kernel the address of the trap signal handler and settings of the system flag; and receiving a return value from the system call module.

* * * * *